United States Patent
Nagano

[11] Patent Number: 5,404,418
[45] Date of Patent: Apr. 4, 1995

[54] CLOSED-LOOP FEEDBACK CONTROL SYSTEM HAVING AN ADAPTIVE FILTER

[75] Inventor: Tetsuaki Nagano, Aichi, Japan

[73] Assignee: Mitsubishi Denki K.K., Tokyo, Japan

[21] Appl. No.: 738,643

[22] Filed: Jul. 31, 1991

[30] Foreign Application Priority Data

Aug. 1, 1990 [JP] Japan .................. 2-204720

[51] Int. Cl.[6] .................................. H02P 5/06
[52] U.S. Cl. ........................ 388/806; 388/910; 388/930
[58] Field of Search .................. 388/803–815, 388/910, 930, 903; 318/432

[56] References Cited

U.S. PATENT DOCUMENTS

| | | | |
|---|---|---|---|
| 4,100,472 | 7/1978 | Mobley | 318/685 |
| 4,300,226 | 11/1981 | Barnette et al. | 318/662 X |
| 4,804,894 | 2/1989 | Machida et al. | 388/812 |
| 4,912,387 | 3/1990 | Moulds | 318/629 |
| 4,947,093 | 7/1990 | Dunstan et al. | 318/561 X |
| 4,963,806 | 10/1990 | Shinohara et al. | 318/621 |
| 4,980,625 | 12/1990 | Shimada | 318/618 X |
| 4,986,150 | 1/1991 | Okazaki | |
| 5,027,047 | 6/1991 | Logan et al. | 318/648 |
| 5,032,776 | 7/1991 | Garagnon | 318/615 X |

FOREIGN PATENT DOCUMENTS 61-146184 3/1986 Japan .
6464599 3/1989 Japan .

Primary Examiner—William M. Shoop, Jr.
Assistant Examiner—David Martin
Attorney, Agent, or Firm—Sughrue, Mion, Zinn, Macpeak & Seas

[57] ABSTRACT

A closed-loop feedback control system is disclosed for controlling an operation of a load. An actual operation signal is subtracted from a reference operation signal to produce a resultant signal which is used to control the operation of the load. A filter unit, such as a notch filter, operates to suppress any machine resonance frequencies found in the operation signal due to load fluctuations, machine variations, operating environment changes, deterioration with age, etc. A filter coefficient of the filter unit is adjusted so that any fluctuation in the resonance frequency can be suppressed effectively.

7 Claims, 12 Drawing Sheets

SPEED CONTROL BANDWIDTH $f_b$    MACHINE RESONANCE FREQUENCY $f_p$ $f_p$

FREQUENCY CHARACTERISTIC OF FILTER (17)

MACHINE RESONANCE FREQUENCY $f_p$

FIG. 11
PRIOR ART
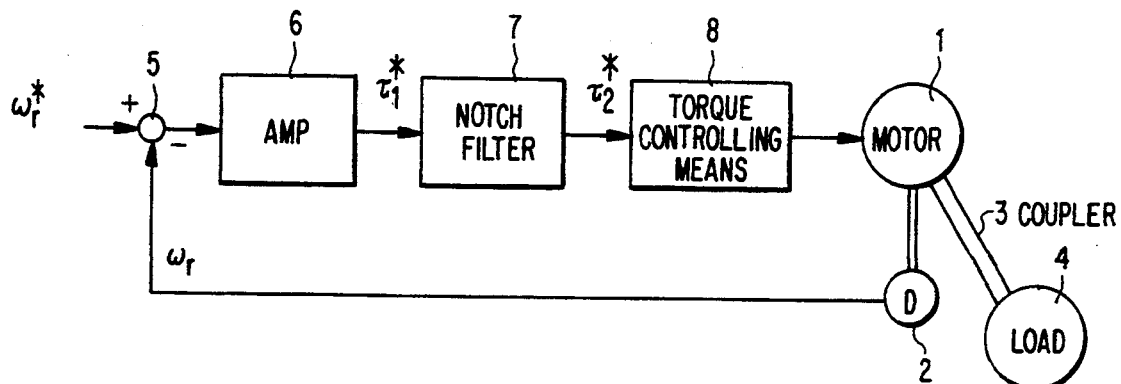
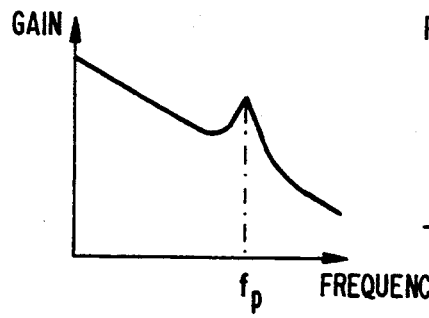
FIG. 12(a)
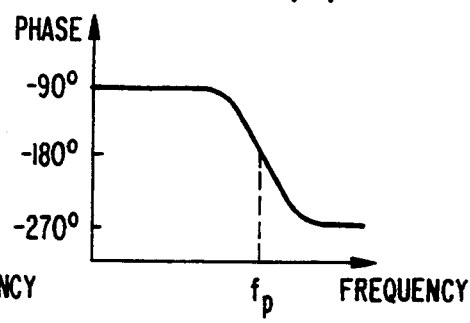
FIG. 12(b)
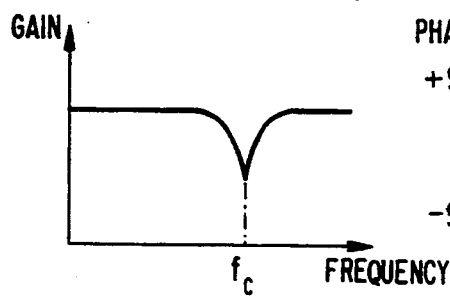
FIG. 13(a)
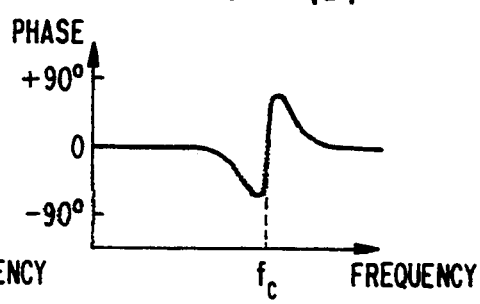
FIG. 13(b)
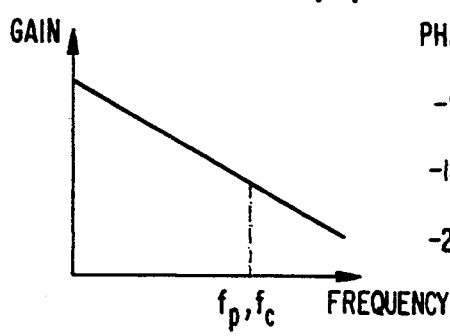
FIG. 14(a)
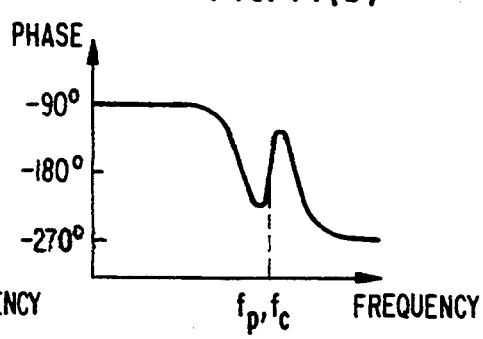
FIG. 14(b)

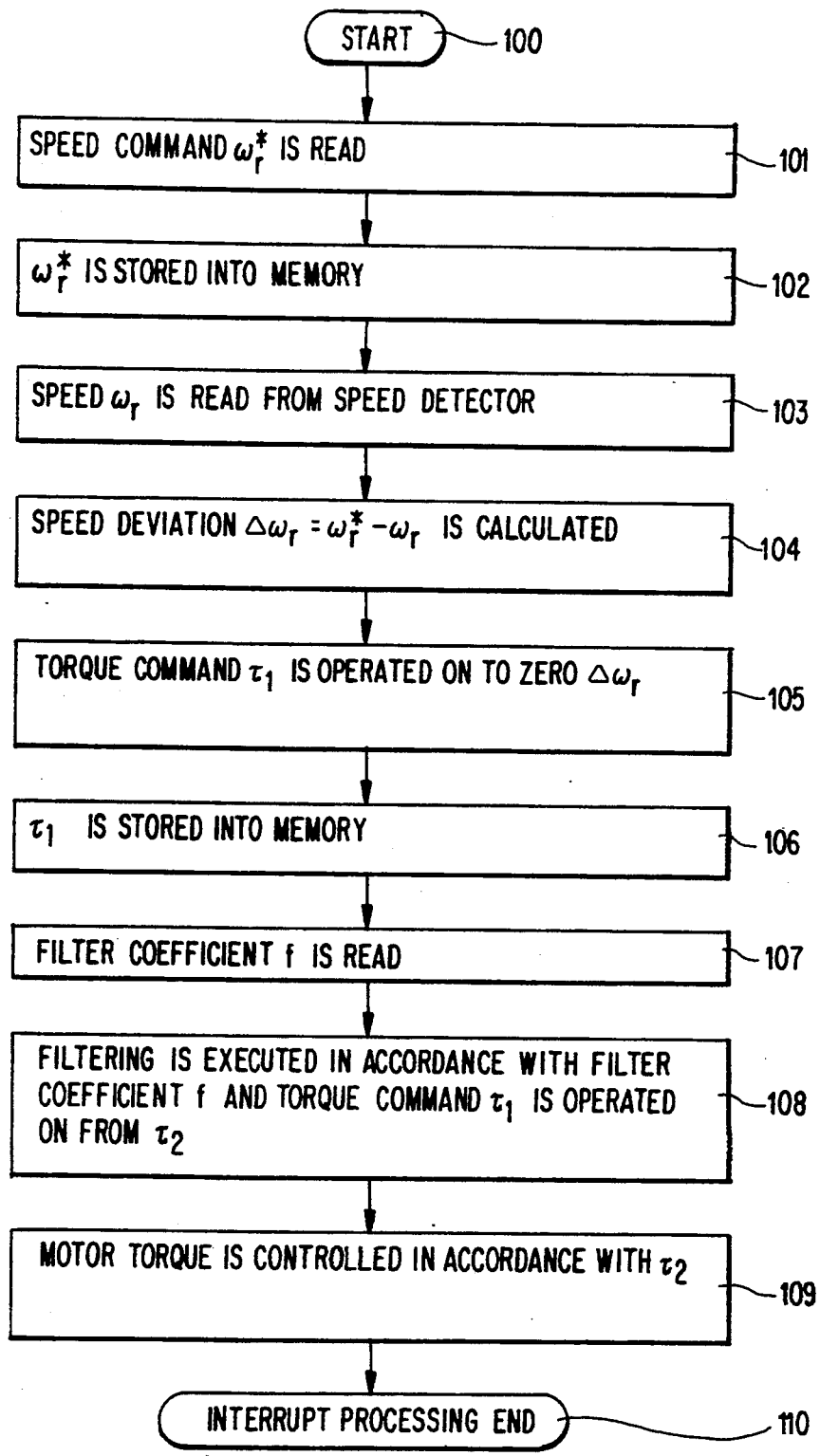

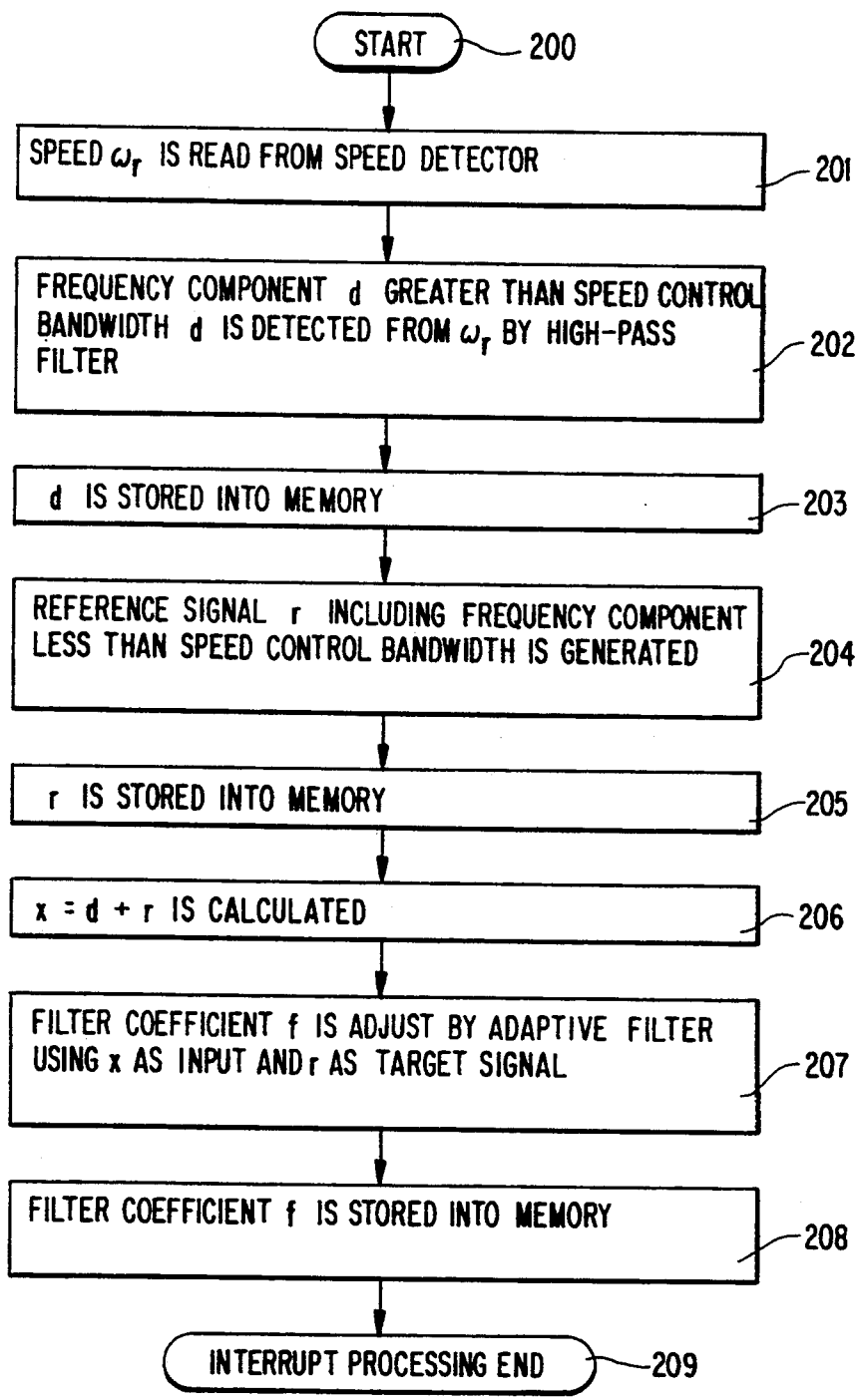

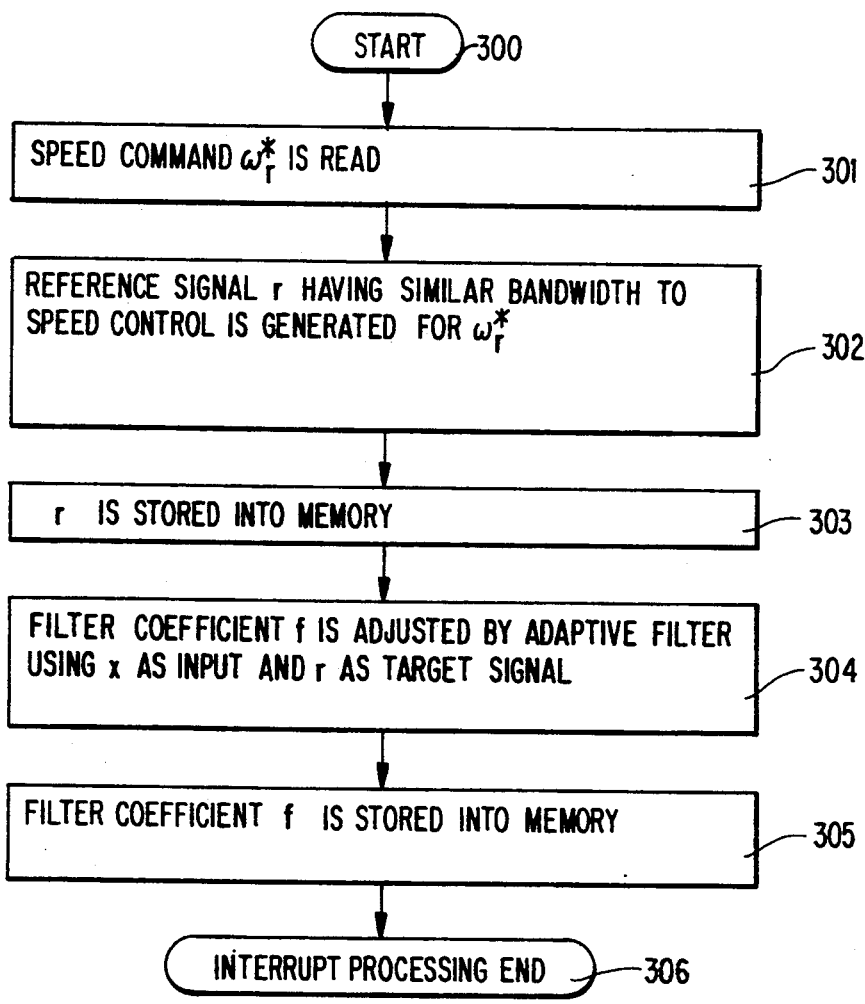

CLOSED-LOOP FEEDBACK CONTROL SYSTEM HAVING AN ADAPTIVE FILTER

BACKGROUND OF THE INVENTION

1. Field of the Invention

The present invention relates to a motor speed controller for suppressing the resonance generated in the driving of a load.

2. Description of the Prior Art

It is known in the art to insert a notch filter in front of the torque controlling unit of a motor speed controller in order to suppress resonance. An example of such a system can be found in Japanese Patent Publication No. 21478, as shown in prior art FIG. 11.

In FIG. 11, motor 1 drives a load 4 via coupler 3. The torque of the motor 1 is controlled by torque controlling unit 8, which receives a new torque command $\tau_2^*$ from a notch filter 7. The notch filter 7 is used to filter a torque command $\tau_2^*$ output from operating/amplifying unit 6 so that any resonance appearing in the signal can be eliminated to produce the new torque command $\tau_2^*$. The operating/amplifying unit 6 outputs the torque command $\tau_1^*$ as a deviation value $\omega_r^* - \omega_r$, representing the difference between the speed command value $\omega_r^*$ and a speed detection value $\omega_r$. Subtractor unit 5 receives the speed command value $\omega_r^*$ from the machine controller (not shown) and the detected speed $\omega_r$ from speed detector 2.

When entered into the subtracting unit 5, the speed detection value $\omega_r$ output by the speed detector 2 is fed back to the motor speed controller. Then the operating-/amplifying unit 6 operates and amplifies the deviation value $\omega_r^* - \omega_r$ entered from the subtracting unit 5 until the value is zero. The unit 6 outputs the result as the torque command value $\tau_1^*$, which is then input to the torque controlling unit 8 via notch filter 7, and the motor 1 is speed-controlled to follow the speed command value $\tau_r^*$ by the output signal of the torque controlling unit 8.

FIGS. 12(a) and 12(b) illustrate the transfer functions of the torque controlling unit 8 and motor 1. The figures indicate the relationship between frequency and gain, and between frequency and phase, respectively, wherein the peak of the gain exists at the frequency $f_p$ due to machine resonance.

FIGS. 13(a) and 13(b) illustrate the transfer functions of the notch filter 7 having a central frequency $f_c$.

FIGS. 14(a) and 14(b) illustrate the functions after passing through the notch filter 7 to the motor 1 when the resonance frequency $f_p$ and the central frequency $f_c$ of the notch filter 7 have been adjusted to match each other. As shown in FIG. 14(a), the peak of the gain due to the machine resonance in FIG. 12(a) and the notch of the gain of the notch filter 7 in FIG. 13(a) offset each other to suppress the machine resonance, thus eliminating the peak from the gain characteristic. As a result, the gain of the operating/amplifying unit 6 can be raised to enhance the response of the speed control system. However, the adjusted filter coefficient is fixed. Hence, if the machine resonance frequency $f_p$ changes according to load fluctuations, machine variations, operating environment changes, deterioration with age, etc., the resonance frequency $f_p$ will not match the central frequency $f_c$ of the notch filter 7. Thus, the suppression of the resonance may not be achieved and the motor control system may become unstable.

A phenomenon occurring due to a mismatch of the notch filter 7 central frequency $f_c$ and the machine resonance frequency $f_p$ will now be described.

FIGS. 15(a) and 15(b) illustrate the characteristics of transmission from the notch filter 7 to the motor 1 at a time when the notch filter 7 central frequency $f_c$ is lower than the machine resonance frequency $f_p$. As shown therein, the peak of the resonance gain is not suppressed sufficiently and a phase delay value in the low frequency range is increased by the phase delay of the notch filter 7; thus, deteriorating the speed response characteristic, e.g., an overshoot increase.

FIGS. 16(a) and 16(b) illustrate the functions of the transmission from the notch filter 7 to the motor 1 at a time when the notch filter 7 central frequency $f_c$ is higher than the machine resonance frequency $f_p$. As shown therein, the peak of the resonance gain is not suppressed sufficiently and the phase delay value in the neighborhood of the gain peak is greatly increased by the phase delay of the notch filter 7. This makes the speed control system unstable and may cause oscillation depending on the gain of the operating/amplifying unit 6, leading to a failure of control.

To avoid an unstable phenomenon occurring when the notch filter 7 central frequency $f_c$ is higher than the machine resonance frequency $f_p$ (as illustrated in FIG. 16(a)), it is inevitable for the motor speed controller of the prior art to take the variation of the machine resonance frequency $f_p$ into consideration and set the notch filter 7 central frequency $f_c$ to be lower than the machine resonance frequency $f_p$. However, this results in the deterioration of the speed response characteristic.

In the motor speed controller according to the prior art, the filter coefficient defining the characteristic of the notch filter 7 for suppressing the machine resonance may be manually adjusted by an operator on a machine-by-machine basis using an oscilloscope, an FFT analyzer, etc., so that the central frequency $f_c$ of the notch filter 7 matches the machine resonance frequency $f_p$. This is done in accordance with the speed detection value $\omega_r$ of the motor 1 at a time when the speed command value $\omega_r^*$ is provided from an external oscillator, or the like. However, this adjustment has the disadvantage that it requires measuring instruments, such as an oscillator and an oscilloscope, as well as much time and skill.

In addition, since the adjusted filter coefficient is fixed, if the machine resonance frequency $f_p$ changes according to load fluctuations, machine variations, operating environment changes, deterioration with age, etc., and as a result, does not match the central frequency $f_c$ of the notch filter 7, the critical problems mentioned above may arise.

A motor control circuit is disclosed in Japanese Patent Disclosure Publication No. 46184, wherein the resonance suppression circuit described above is applied to the take-up mechanism of a magnetic tape storage device. When a tape is taken up, the resonance filter of the mechanical system varies according to the take-up position (value) of the tape. The control circuit is designed to overcome the disadvantage caused by a mismatch of the machine resonance frequency and a notch filter central frequency by changing the central frequency in three stages in accordance with an external signal corresponding to the changes of the machine resonance frequency. The central frequency is changed by switching a resistance element, comprising the notch filter, using a short-circuit switch.

As the machine resonance frequency changes continuously according to the take-up value of the tape, a problem arises in that a mismatch of the machine resonance frequency and the notch filter central frequency will occur which cannot be prevented by merely changing the notch filter central frequency in three steps, as indicated in the embodiment.

A positioning controller disclosed in the Japanese Patent Disclosure Publication No. 64599 is employed to position the magnetic head of a disc drive using a step motor. In advance of ordinary access to a disc, the positioning controller first detects the vibration of the magnetic head at a time when the magnetic head is moved step by step to vibration detecting tracks provided at specific positions of the inner and outer peripheries of the disc, to select a notch filter on a trial and error basis. This filter will suppress the amplitude of that vibration within a predetermined value from among a plurality of prepared notch filters different in frequency characteristic. During ordinary access to the disc, the vibration characteristic of the step motor varying according to the track position is suppressed by selecting the appropriate notch filter for the tracks divided into three areas: inner periphery, middle and outer periphery. That is, the notch filter selected by the inner periphery vibration detecting track is chosen on the inner peripheral tracks, the notch filter selected by the outer periphery vibration detecting track is chosen on the outer peripheral tracks, and the notch filter representing the characteristic midway between the inner periphery notch filter and the outer periphery notch filter is chosen for the middle tracks.

In this manner, it is necessary to select the notch filter that meets the step motor vibration characteristic changing in accordance with the magnetic head position and the magnetic disc installed. This creates a problem in that it requires a plurality of notch filters to be prepared, making the circuit larger in scale and complicated in structure. The circuit structure is further complicated by a step response detecting unit which must be added to detect the vibration of a moved member, i.e., the magnetic head.

SUMMARY OF THE INVENTION

Accordingly, it is an object of the present invention to overcome the disadvantages of the prior art by providing a motor speed controller that automates the filter adjustment for suppressing the machine resonance occurring in driving a load to make troublesome adjustment unnecessary, and ensures a satisfactory resonance suppressing effect in the event the machine resonance frequency changes during operation.

A motor speed controller in accordance with a first embodiment of the present invention comprises: a subtracting unit for outputting a deviation value between a speed command value and a speed detection value output by a speed detecting unit for detecting the speed of a mechanical system consisting of a motor and a load driven by said motor; an operating/amplifying unit for operating on, amplifying and outputting said deviation value as a torque command value; a torque controlling unit for controlling the torque of said motor in accordance with said torque command value; a main filter inserted in any position of a closed loop system ranging from the output end of said speed detecting unit to the input end of said torque controlling unit and capable of limiting the passage of a frequency component in accordance with an entered filter coefficient; and a filter coefficient setting unit for operating on said filter coefficient for limiting the passage of said frequency component in accordance with the frequency component overlapping said entered speed detection value and outputting the result to said main filter.

A motor speed controller in accordance with a second embodiment of the present invention comprises a filter coefficient setting unit having a reference signal generating unit for outputting a reference signal including a frequency component lower than a predetermined frequency; a high-pass filter for receiving the speed detecting value output by the speed detecting unit and passing the frequency component higher than the predetermined frequency overlapping said speed detecting value; an adding unit for adding the reference signal output by said reference signal generating unit and said frequency component having passed said high-pass filter; and an adaptive filter for receiving the output signal of said adding unit and said reference signal, operating on a filter coefficient for limiting the passage of said frequency component, and outputting the result to the main filter.

A motor speed controller in accordance with a third embodiment of the present invention comprises a filter coefficient setting unit having a reference signal generating unit for receiving a speed command value and outputting a reference signal having a predetermined bandwidth; and an adaptive filter for receiving the reference signal output by said reference signal generating unit and the speed detection value output by the speed detection unit, operating on a filter coefficient for limiting the passage of the frequency component higher than the predetermined filter overlapping said speed detection value, and outputting the result to the main filter.

The filter coefficient setting unit according to the first embodiment operates on the filter coefficient for limiting the passage of the frequency component in accordance with said frequency component overlapping the entered speed detection value which is output by the speed detecting unit for detecting the speed of the mechanical system comprising the motor and the load driven by said motor, and outputs the result to the main filter inserted in any position of a closed loop system ranging from the output end of said speed detecting unit to the input end of said torque controlling unit, said main filter limiting the passage of the frequency component in accordance with said filter coefficient entered.

The reference signal generating unit according to the second embodiment outputs the reference signal including the frequency component lower than the predetermined frequency. The high-pass filter receives the speed detection value output by the speed detecting unit and passes the frequency component higher than the predetermined frequency overlapping said speed detection value. The adding unit adds the reference signal output by said reference signal generating unit and said frequency component having passed said high-pass filter. Then the adaptive filter receives the output signal of said adding unit and said reference signal, operates on the filter coefficient for limiting the passage of the frequency component higher than the predetermined frequency overlapping said speed detection value, and outputs the result to the main filter.

The reference signal generating unit according to the third embodiment receives the speed command value and outputs the reference signal having the predetermined bandwidth. The adaptive filter receives the reference signal output by said reference signal generating unit and the speed detection value output by the speed detecting unit, operates on the filter coefficient for limiting the passage of the frequency component in accordance with said frequency component superimposed on said speed detection value, and then outputs the result to the main filter.

BRIEF DESCRIPTION OF THE DRAWINGS

FIG. 11 is a block diagram illustrating a motor speed controller known in the art.

FIGS. 12(a) and 12(b) to FIGS. 16(a) and 16(b) are charts representing the transmission functions of the elements in FIG. 11.

FIGS. 17–19 are flowcharts indicating the processing which takes place in a software implementation of FIGS. 1 and 5.

DESCRIPTION OF THE PREFERRED EMBODIMENTS

Figure 1:
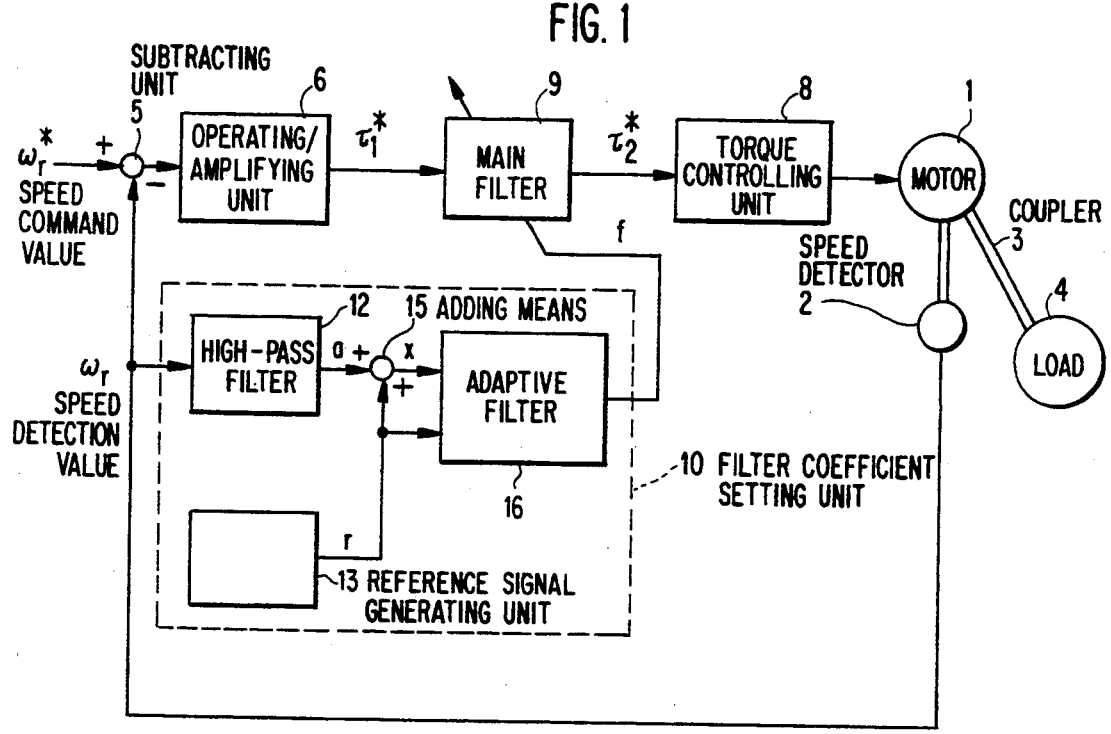
FIG. 1 is a block diagram of a motor speed controller according to one embodiment of the present invention.

FIG. 1 is a block diagram of a motor speed controller in accordance with one embodiment of the present invention. FIG. 1 illustrates a main filter 9 provided for limiting the passage of a frequency component in accordance with an entered filter coefficient f output from a filter coefficient setting unit 10.

The block representing the filter coefficient setting unit 10 has a high-pass filter 12 provided for passing a frequency component higher than a predetermined frequency in the same region as an entered speed detection value $\omega_r$ output by a speed detector 2. The setting unit 10 further includes a reference signal generating unit 13, adding unit 15, and an adaptive filter 16. The reference signal generating unit 13 outputs a reference signal r having frequency components less than the predetermined frequency. This output is sent to adding unit 15 and adaptive filter 16. The high-pass filter 12 passes a signal including a resonance frequency component d received from the detector 2. The adding unit 15 receives the high-pass filter output and adds it to the reference signal r output from the signal generating unit 13. The resultant signal x is output to adaptive filter 16. The adaptive filter 16, then, automatically operates on the filter coefficient f to limit the passage of the frequency component d, and outputs the result to main filter 9. It will be appreciated that where the main filter 9 and adaptive filter 16 employ plural coefficients, one or more coefficients may be subject to automatic operation/variation in accordance with the invention. In this specification, for purposes of clarity, the singular term "filter coefficient" is consistently employed, but should be interpreted as covering both the singular and plural cases.

Figure 6:
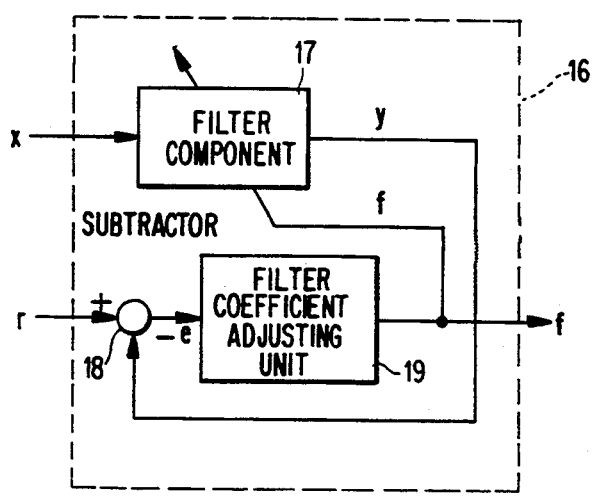
FIG. 6 is a block diagram illustrating the basic configuration of an adaptive filter according to the present invention.

FIG. 6 is a block diagram illustrating the basic configuration of the adaptive filter 16 having a filter 17 and a filter coefficient adjusting unit 19 for adjusting the filter coefficient of the filter 17.

FIGS. 7(a), 7(b), 7(c), 7(d) and 7(e) indicate the power spectra of the reference signal r, the signal d, input x, output y, and deviation e before adjustment of the filter coefficient f, respectively.

Figure 8A:
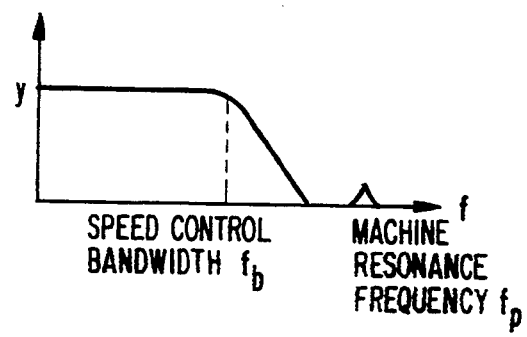
Figure 8B:
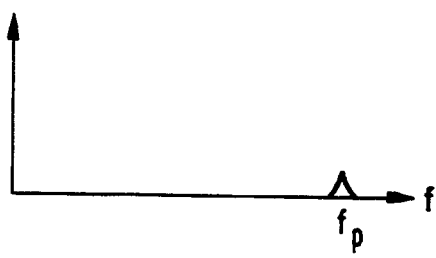
Figure 8C:
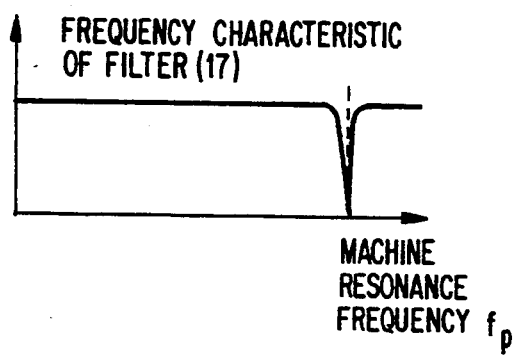

FIGS. 8(a), 8(b) and 8(c) indicate the power spectrum of the output y after adjustment of filter coefficient f, the deviation e, and the frequency characteristic of the filter 17, respectively.

Figure 9:
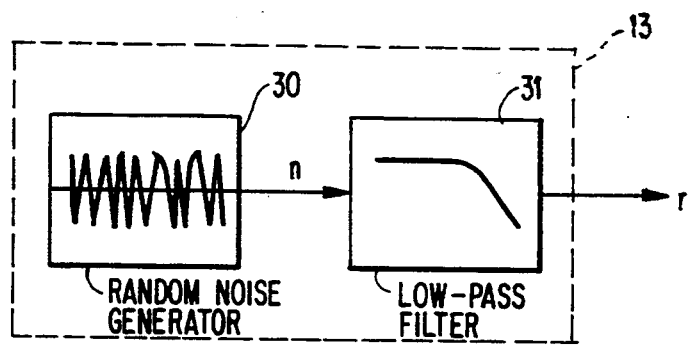
FIG. 9 is a block diagram illustrating one embodiment of the reference signal generating unit 13 of the present invention.

FIG. 9 is a block diagram illustrating one embodiment of the reference signal generating unit 13, having a random noise generating circuit 30, and a low-pass filter 31 which outputs the reference signal r.

Operation will now be described with reference to FIGS. 1, and 6 through 9.

Referring to FIG. 1, the cut-off frequency of the high-pass filter 12 in the filter coefficient setting unit 10 has been set to a speed control bandwidth $f_b$. The high-pass filter 12 receives a motor speed $\omega_r$ (i.e., speed detection value output by the speed detection unit 2) and outputs a machine resonance frequency component d included in that speed $\omega_r$. The speed control bandwidth $f_b$ includes a frequency band at which the gain of a closed-loop transmission function ranging from the speed command to the speed of the motor 1 to be controlled is $1/\sqrt{2}$ times that of a dc gain. The speed control bandwidth $f_b$ is ordinarily set to less than ⅓ to ½ of the machine resonance frequency $f_p$. The reference signal generating unit 13 generates the reference signal r including the same frequency components as the speed control bandwidth $f_b$. The adder 15 adds the high-pass filter 12 output d and the reference signal r and outputs a signal x.

The adaptive filter changes its own characteristic to output the most appropriate signal in accordance with the input signal applied; i.e., the filter changes its characteristic according to the quality of the input signal. Hence, the adaptive filter 16 adjusts its own filter coefficient serially so that its output y is most approximated to the target signal, i.e., reference signal r, in response to the input x. The input x includes the reference signal r and the vibration component d caused by machine resonance. The adaptive filter 16 adjusts its own filter coefficient to become a filter which passes the component of the frequency band that the reference signal r has, while suppressing other frequency components, here the component d due to machine resonance (i.e., it becomes a notch filter of which the central frequency $f_c$ matches the machine resonance frequency $f_p$). Further, the filter coefficient of the main filter 9 is set to the same value as that of the adaptive filter 16 by the signal therefrom so as to have the characteristic of a notch filter.

As described above, the main filter 9 is automatically adjusted to have a characteristic which suppresses the machine resonance frequency component which is the source of vibration due to machine resonance included in the output $\tau_1^*$ of the operating/amplifying unit 6. Incidentally, if the input of the adaptive filter 16 is the vibration component d and the target signal is zero (i.e., r is zero), a filter which suppresses the vibration component due to machine resonance would in principle be generated according to the operation principle of the adaptive filter 16. In this case, however, the filter may have a frequency characteristic which cuts off all frequency components, and it is not ensured that the filter will provide the desired characteristic of passing the frequency component up to the speed control bandwidth and suppressing the machine resonance frequency component. In FIG. 1, therefore, the optimum input of the adaptive filter 16 is the signal x which is the sum of non-zero reference signal r and the vibration component d.

In the block diagram of the adaptive filter 16 shown in FIG. 6, the filter 17 receives and filters the signal x, and the filter coefficient adjusting unit 19 adjusts the filter coefficient of the filter 17 to reduce the deviation e between the reference signal r and the filter output y output by subtracting unit 18, so that the output y is most approximated to the target signal, i.e., reference signal r. In the filter 17, a finite impulse response (FIR) filter (e.g., a transversal filter or a tapped delay line filter) is generally employed and an infinite impulse response (IIR) filter, or the like, may be used. Any of these digital filters can be used by software processing with a microprocessor, as well known in the art. In the filter coefficient adjusting unit 19, a least mean square (LMS) algorithm, a recursive least square (RLS) algorithm, or the like, can be used. These algorithms are also digital processing techniques and can be employed with a microprocessor. The operation of, for example, the LMS algorithm will be described briefly.

If the degree of the filter 17 is n (there are (n+1) filter coefficients), the square of the deviation e has a curved surface like a bowl in an (n+1)-dimensional space with respect to the filter coefficient f and has a single minimum point. The LMS algorithm adjusts the filter coefficient at the next sampling by subtracting a variation value proportionate to the gradient of the bowl-shaped curved surface from the filter coefficient at the current sampling in order to converge the square of the deviation e on said minimum point.

Figure 7A:
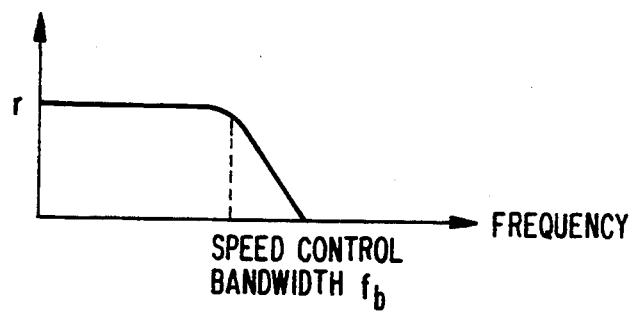
FIGS. 7(a) to 7(e) and FIGS. 8(a) to 8(c) are graphs indicating the power spectra of various parts and the frequency characteristic of the adaptive filter 16 in the embodiments of the present invention.
Figure 7B:
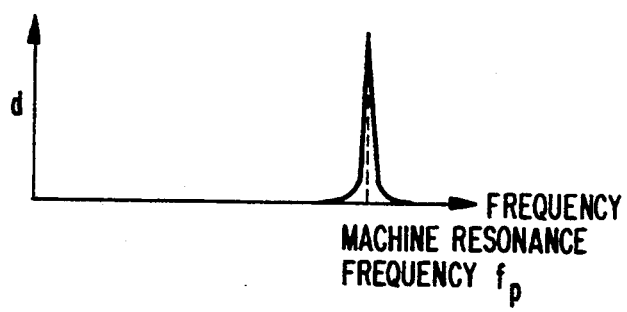
Figure 7C:
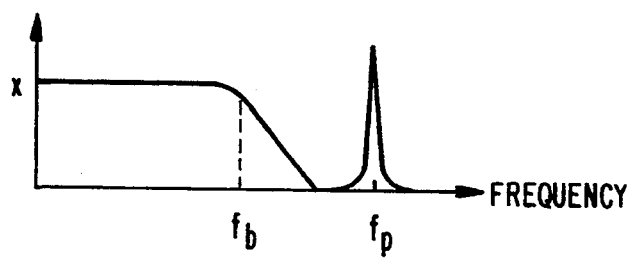
Figure 7D:
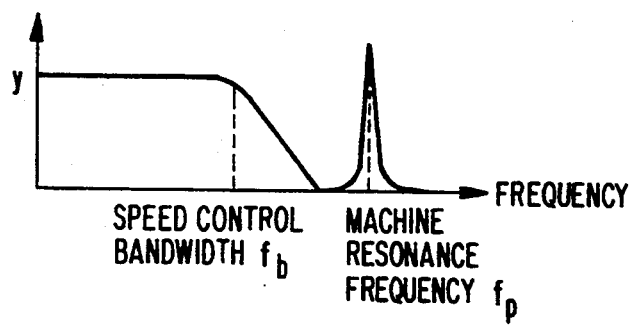
Figure 7E:
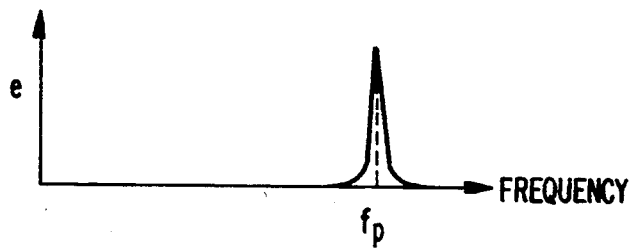

The cut-off frequency of the low-pass filter 31 (FIG. 9) included in the reference signal generating unit 13 is set to the speed control bandwidth $f_b$. Consequently, the power spectrum of the reference signal r has a characteristic of attenuating above the speed control bandwidth $f_b$, as shown in FIG. 7(a), and includes the frequency component up to the speed control bandwidth $f_b$, but does not include the machine resonance frequency component. When a machine resonance exists, the power spectrum of the high-pass filter 12 output d has a peak at the machine resonance frequency $f_p$, as shown in FIG. 7(b). Therefore, the power spectrum of the signal x, i.e., the sum of the high-pass filter 12 output d and the reference signal r, results in the signal shown in FIG. 7(c). As described above, because the input x of the filter 17 in the adaptive filter 16 (FIG. 6) includes the reference signal r, which includes the frequency component up to the speed control bandwidth $f_b$, and the high-pass filter 12 output d which is the vibration component due to the machine resonance, the power spectrum of the output y before filter coefficient adjustment has a waveform similar to the power spectrum of the input x, as shown in FIG. 7(d). Accordingly, the power spectrum of the deviation e between the reference signal r and the output y corresponds to that of the signal d in FIG. 7(b). This is the vibration component caused by the machine resonance as shown in FIG. 7(e), and the power spectrum of the output y is, therefore, approximated to that of the reference signal r, as shown in FIG. 8(a). This is done by adjusting the filter coefficient to reduce the deviation e, as shown in FIG. 8(b). As a result, the filter 11 is automatically adjusted to a frequency characteristic for suppressing the output d of the high-pass filter which is the vibration component caused by the machine resonance, i.e., a notch filter characteristic having the central frequency $f_c$ matching the machine resonance frequency $f_p$, as shown in FIG. 8(c).

Incidentally, as the filter coefficient f of the main filter 9 is set to the same value as that of the filter 17 in the adaptive filter 16, the main filter 9 is automatically adjusted to be a notch filter of which central frequency $f_c$ matches the machine resonance frequency $f_p$. Hence, the main filter 9 need not be otherwise adjusted to suppress the machine resonance. Furthermore, if the machine resonance has caused vibration in motor speed $\omega_r$ due to the change in machine resonance frequency $f_p$, the aforementioned adjustment of the filter coefficient f is made to allow automatic follow-up to the change in machine resonance frequency $f_p$, thereby eliminating the possibility of unstable speed control.

Figure 2:
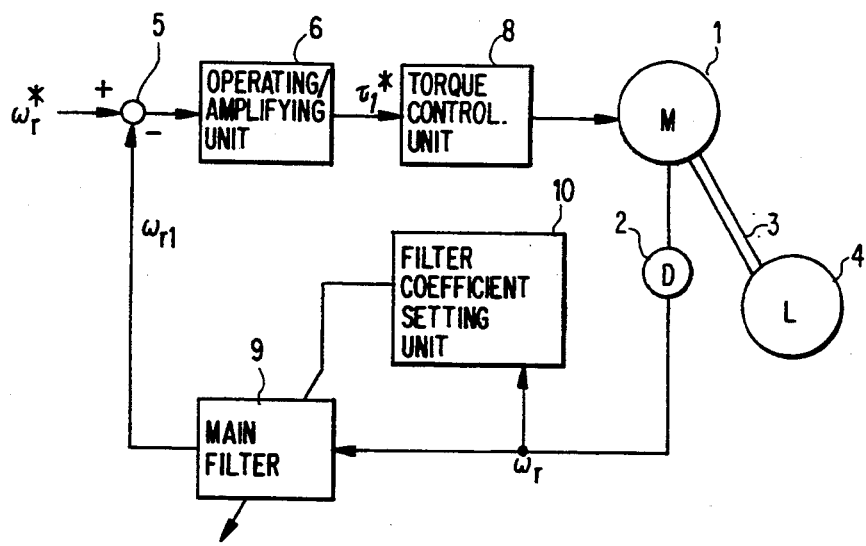
FIG. 2 is a block diagram of the motor speed controller illustrating a variation of position of the adaptive filter in the main feedback loop according to another embodiment of the present invention.

FIG. 2 is a block diagram of a motor speed controller according to another embodiment of the present invention, wherein the numerals used in FIG. 1 identify identical parts. FIG. 1 is different from FIG. 2 in that the main filter 9 of FIG. 2 receives the speed detection value $\omega_r$ of the motor 1 detected by the speed detector 2. The main filter 9 filters and outputs the speed detection value $\omega_{r1}$, and the operating/amplifying unit 6 receives the deviation between the speed command value $\omega_r^*$, i.e., the output of the subtracter 5, and the output $\omega_{r1}$ of the main filter 9. The unit 6 outputs to the torque controlling unit 8 the torque command value $\tau_1^*$ which will reduce that deviation $\omega_r^* - \omega_{r1}$. Like the embodiment in FIG. 1, the main filter 9, then, receives the filter coefficient f output by the filter coefficient setting unit 10 and is automatically adjusted to be a notch filter which suppresses the machine resonance frequency component. Therefore, the machine resonance frequency component is removed from $\omega_{r1}$ and there is no possibility that after comparison with the speed command value $\omega_r^*$ by the subtracter 8, $\omega_{r1}$ will be amplified by the operating/amplifying unit 6 and cause vibration.

Figure 3:
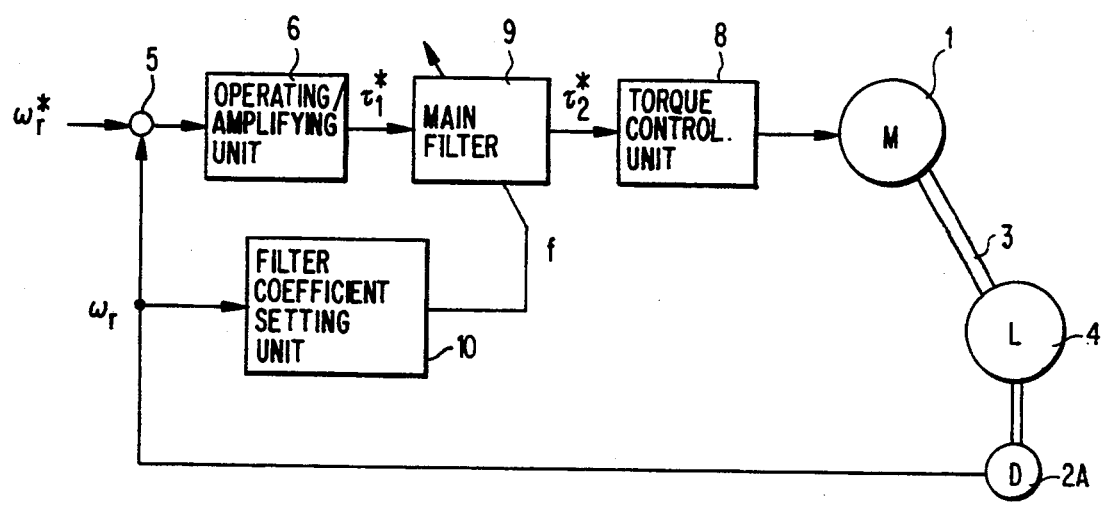
FIGS. 3 and 4 are block diagrams of a speed controller controlling the speed of a load according to another embodiment of the present invention.

FIG. 3 is a block diagram of a motor speed controller according to a further embodiment of the present invention, wherein a speed detector 2A is provided for detecting the speed $\omega_r$ of the load 4 (as opposed to the detection of speed of the motor achieved in the previous embodiments). The embodiment shown in FIG. 3 performs similar operation and has a similar effect to the one illustrated in FIG. 1, except that the speed detector 2A is provided in the load 4 for detecting and controlling the speed of the load 4.

Figure 4:
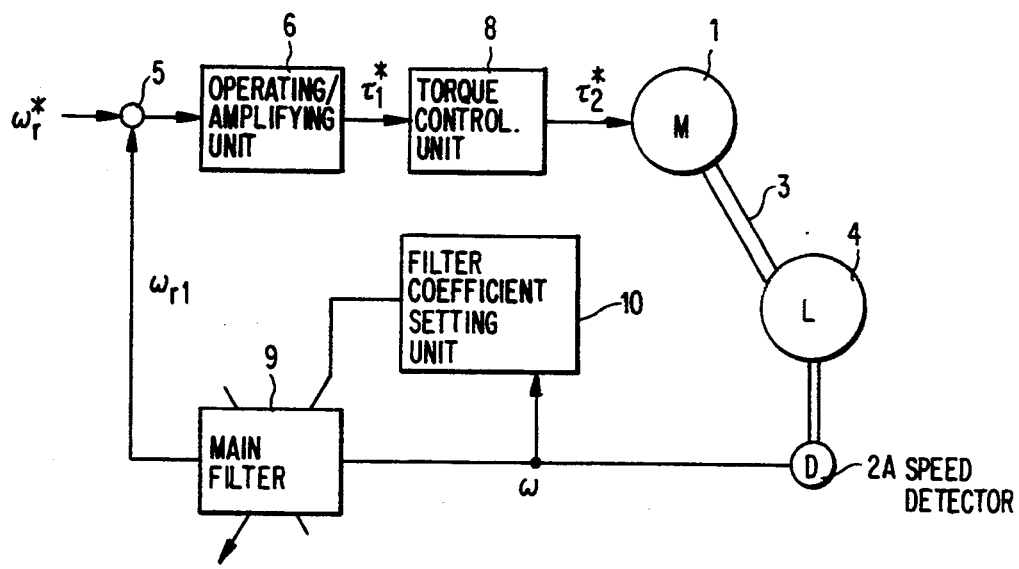

FIG. 4 is a block diagram of a motor speed controller according to a further embodiment of the present invention. The embodiment shown in FIG. 4 performs similar operation and produces a similar result as the one illustrated in FIG. 2, except that the speed detector 2A is provided in the load 4 for detecting and controlling the speed of the load 4.

Figure 5:
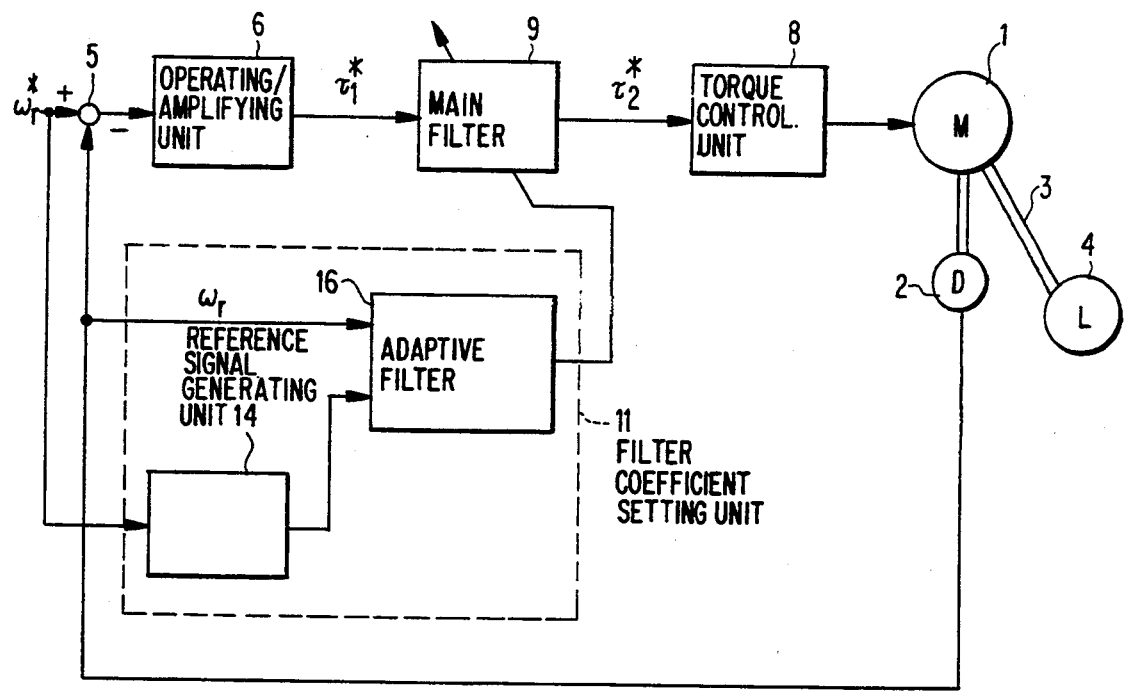
FIG. 5 is a block diagram of a motor speed controller according to another embodiment of the present invention.

FIG. 5 is a block diagram of a motor speed controller according to another embodiment of the present invention, comprising a filter coefficient setting unit 11 and reference signal generating unit 14. The filter coefficient setting unit 11 is different from the filter coefficient setting unit 10 (shown in FIG. 1) in that the reference signal generating unit 14 receives the speed command value $\omega_r^*$ and generates the reference signal r having almost the same bandwidth $f_b$ as that of the speed control system in response to the speed command value $\omega_r^*$. Further, the adaptive filter 16 outputs the filter coefficient f in response to the input of said reference signal r and the speed detection value $\omega_r$. However, the speed controller is substantially the same in configuration and operation as the one shown in FIG. 1.

Operation of the filter coefficient setting unit 11 shown in FIG. 5 will now be described.

Figure 10:
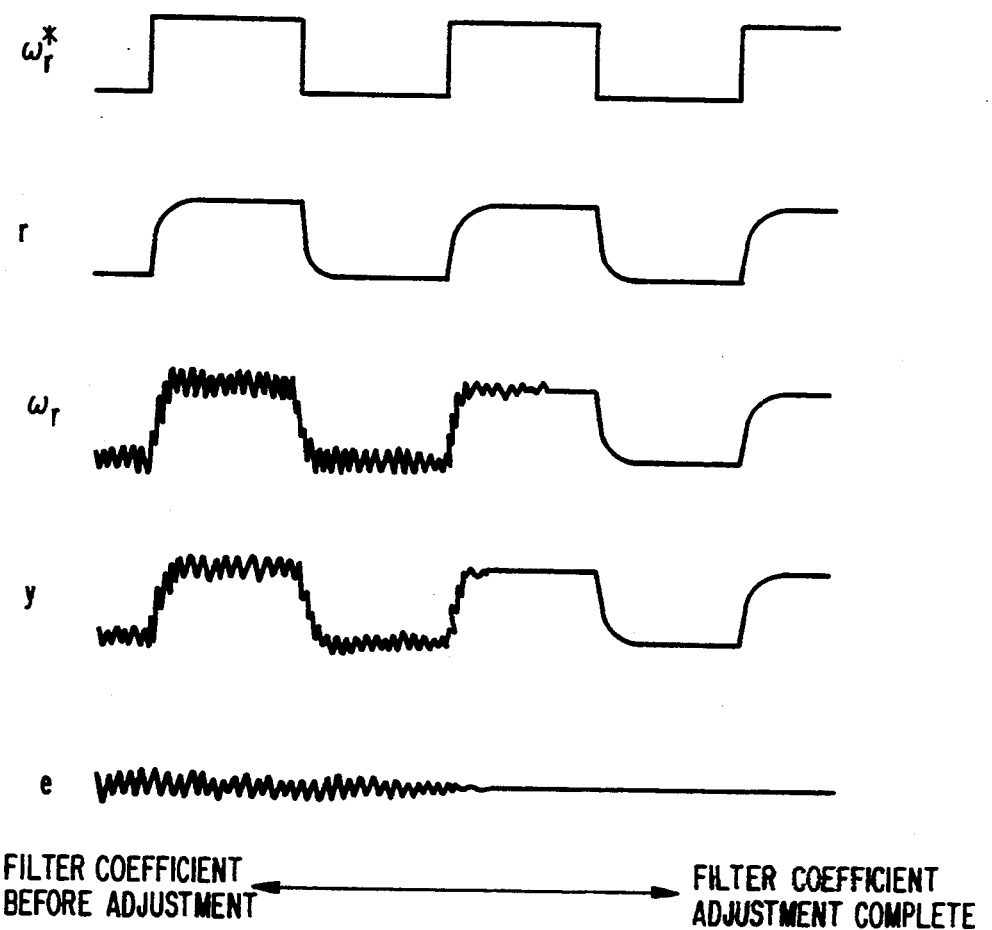
FIG. 10 is a graph representing the response waveforms of parts of the embodiment shown in FIG. 5.
Figure 15A:
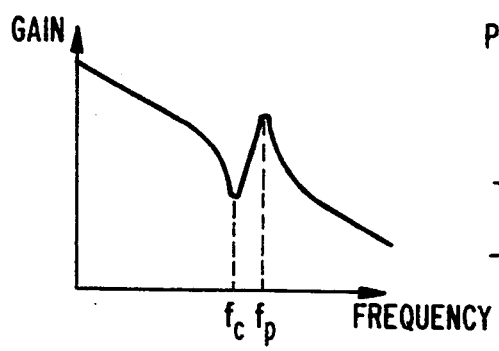
Figure 15B:
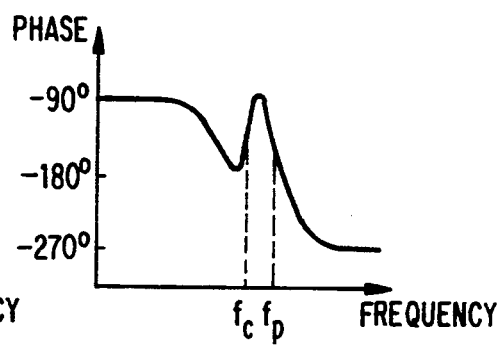
Figure 16A:
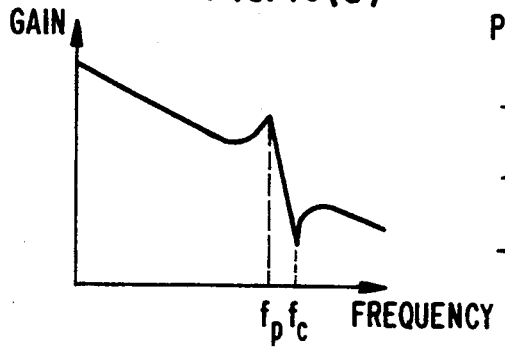
Figure 16B:
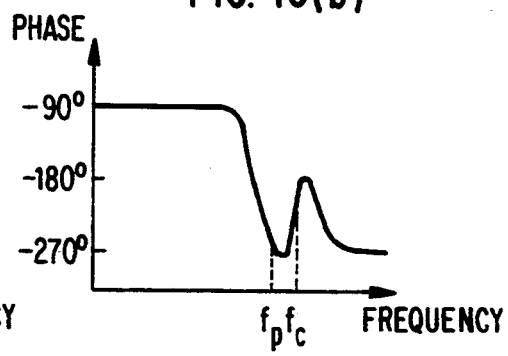

FIG. 10 shows response waveforms of the reference signal r, the motor speed $\omega_r$, the output y of the adaptive filter 16, shown in FIG. 6, and the deviation e between the reference signal r and the output y, which are obtained at a time when the speed command value 107 $_r^*$ is changed. In FIG. 10, the motor speed detecting value $\omega_r$ overlaps (is superimposed on) a response component to the speed command value $\omega_r^*$ and a vibration component due to the machine resonance independent of that response component. Since the reference signal $\omega_r$ is pre-adjusted as described previously to be in almost the same bandwidth as that of the speed control system, the reference signal r has almost the same waveform as that of the response component of the motor speed $\omega_r$ (excluding the reference value and the vibration component), as can be seen by comparing indicated by the waveforms of $\omega_r$ and r. As indicated by the waveform y, the output y of the adaptive filter 16 has a similar waveform to that of $\omega_r$ before the filter coefficient f is adjusted. Hence, the waveform of the deviation e between the reference signal r and the output y develops a waveform equivalent to the vibration component included in the motor speed $\omega_r$.

The filter coefficient adjusting unit 19 (FIG. 6) adjusts the filter coefficient f sequentially to reduce the deviation e so that the output y is approximated to the reference signal r. Accordingly, since the filter 17 has the characteristic of a notch filter which only suppresses the vibration component caused by machine resonance at the time when the deviation e is fully reduced after the adjustment of the filter coefficient f, the vibration component disappears from the motor speed $\omega_r$ and the output y. Furthermore, because the filter coefficient f of the main filter 9 is set to the same value as that of the filter 17 in the adaptive filter 16, the main filter 9 is automatically adjusted to be a notch filter of which central frequency $f_c$ matches the machine resonance frequency $f_p$. Thus, the main filter 9 is automatically adjusted to suppress the machine resonance. Moreover, if the machine resonance frequency $f_p$ has changed, the aforementioned adjustment process is repeated so that the main filter 9 is automatically adjusted to have a notch filter characteristic corresponding to the machine resonance frequency $f_p$.

The reference signal generating unit 14 has a first order lag element of a time constant $T_1$ represented by a transmission function in expression (1). $T_1$ may be set so that the reference signal r has almost the same response in the bandwidth of the speed control system as the speed command value $\omega_r^*$.

$$r = \frac{1}{1 + sT_1} \omega_r^* \qquad (1)$$

where s is a differential operator.

For example, if the operating/amplifying unit 6 has been set to provide a bandwidth of f Hz in the speed control system of the motor shown in FIG. 5, the time constant $T_1$ of the first order lag element may be set as follows:

$$T_1 1/(2 \cdot \pi \cdot f) \qquad (2)$$

In FIG. 5, the first order lag element may be replaced by a second order lag element or the like which has been adjusted to have almost the same response to the speed control.

By replacing the filter coefficient setting unit 11 (FIG. 5) with the filter coefficient setting unit 10, illustrated in FIGS. 2 to 4, similar operation is performed and a similar effect is produced as in other embodiments.

In the embodiments illustrated in FIGS. 1 to 4, the cut-off frequency of the low-pass filter 31 set to the speed control bandwidth $f_b$ in the block diagram of the reference signal generating unit 13 (FIG. 9) may be defined between $f_b$ and $f_p$ because any frequency component less than the machine resonance frequency $f_p$ may be included in the reference signal r.

In the embodiments illustrated in FIGS. 1 to 4, the high-pass filter 12 of which cut-off frequency has been set to the speed control bandwidth may be a band-pass filter, or the like, that has a characteristic where the low-range cut-off frequency has been set in the vicinity of the speed control bandwidth and the high-range cut-off frequency has been set to a higher value than the machine resonance frequency. This is because the machine resonance frequency component included in the speed $\omega_r$ of the motor 1, or the load 4, may be mainly detected by the high-pass filter 12.

In the block diagram illustrating the embodiment of the reference signal generating unit 13 (FIG. 9), the random noise generating unit 30 may be replaced by a rectangular wave generating circuit or a triangular wave generating circuit, in which case harmonic components included in the rectangular wave or the triangular wave should be set so that many harmonic components are included at less than the cut-off frequency of the low-pass filter 31.

The torque controlling unit 8 may be directly controlled by, for example, a current, a voltage of a magnetic flux of the motor 1, or a combination of the two if that controls the torque of the motor 1.

The output of the operating/amplifying unit 6 need not indicate the torque directly and may be, for example, a current, a voltage, a magnetic flux, or the like, of the motor 1 if such controls the torque of the motor 1.

As the coupler 3, the shaft directly connecting the motor 1 and the load 4 may be replaced by gears, a belt and pulleys, a ballscrew and nuts, or a combination of such elements. In the case of a direct drive directly coupling the motor 1 and the load 4, the shaft of the motor 1 may be regarded as a coupler, and if the rigidity of the load 4 is small, the load 4 may be regarded as comprising a coupler to a new load.

When the circuit shown in FIG. 1 and FIG. 5 has been implemented by software, i.e., when the program stored in the memory is executed by the CPU in the controller comprising the CPU, memory, interface, etc., a function equivalent to the operation of the circuit illustrated in FIGS. 1 and 5 is executed in the sequence shown in FIGS. 17 to 19 and described below.

FIG. 17 indicates an operation flowchart with the exception of the operation of the filter coefficient setting units 10 and 11 shown in FIGS. 1 and 5, respectively.

The operation flowcharts of the filter coefficient setting units 10 and 11 are given in FIGS. 18 and 19, respectively.

Since the filter coefficient f is operated on, stored into the memory (not illustrated), and updated serially by the execution of the operation shown in FIG. 18 or 19, the filter coefficient f is read from memory at step 107 and filtering is executed at step 108.

Figure 20:
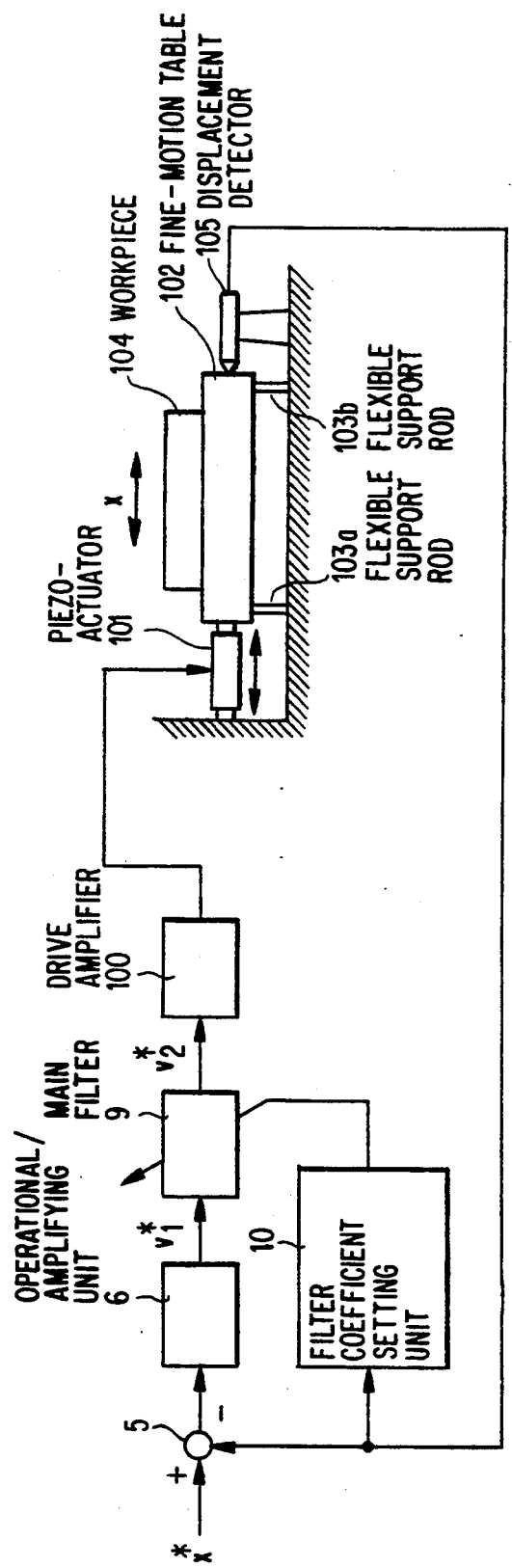
FIG. 20 illustrates an application of the invention to a fine-motion table using a piezo-actuator.

FIG. 20 illustrates the present invention as applied to a fine-motion table positioning device employing a piezo-actuator for use with semiconductor equipment, etc.

A piezo-actuator 101 is fixed at one end and secured to a fine-motion table 102 at the other end. The piezo-actuator 101 stretches in the x direction in accordance with a voltage applied by a drive amplifier 100 to drive the fine-motion table 102 supported by a flexible support rod 103 and a workpiece mounted thereon. The displacement x of the fine-motion table 102 is detected and compared with a command value x* by a displacement detector 105 and a voltage command $V_1^*$ is output by operation/amplifying unit 6 so that their deviation is zeroed. $V_1^*$ is filtered by a main filter 9 and output to the drive amplifier 100 as a new voltage command $V_2^*$. The fine-motion table 102 is supported by the flexible support rod 103 to avoid the problem of friction which influences positioning accuracy. However, since said flexible support rod 103, fine-motion table 102, and workpiece constitute a machine resonance system, an attempt to position the fine-motion table 102 on a high-speed/rapid response basis for improved production efficiency causes vibration to occur due to machine resonance and, in addition, causes a resonance frequency to change in accordance with a change in workpiece weight. According to the present invention, the filter coefficient of the main filter 9 is automatically set, as appropriate, by filter coefficient setting unit 10 to restrict the passage of a machine resonance frequency component, so that vibration does not occur if an attempt to position the fine-motion table 102 is made.

It will be apparent that the present invention, as described above, achieves a motor speed controller comprising a filter coefficient setting unit for operating on a filter coefficient in accordance with a frequency component superimposed on a speed detection value output by a speed detecting unit for detecting the speed of a mechanical system consisting of a motor and a load driven by said motor, and a main filter for limiting the passage of a frequency component in accordance with said filter coefficient, so that the resonance frequency component of said mechanical system output by a torque controlling unit for controlling the torque of said motor is reduced in accordance with the resonance frequency component of said mechanical resonance superimposed on said speed detection value, and as a result, the resonance of said mechanical system is suppressed.

It will also be apparent that the present invention achieves a motor speed controller having a filter coefficient setting unit that operates on the filter coefficient relatively accurately and outputs the operation result to the main filter to suppress the resonance of said mechanical system, because the invention comprises a reference signal generating unit for outputting a reference signal including a frequency component lower than a predetermined frequency, a high-pass filter for passing the frequency component higher than the predetermined frequency superimposed on the speed detection value output by the speed detecting unit, an adding unit for adding the reference signal output by said reference signal generating unit and said frequency component having passed said high-pass filter, and an adaptive filter for receiving the output signal of said adding unit and said reference signal, operating on a filter coefficient for limiting the passage of said frequency component, and outputting the result to the main filter.

The present invention also comprises a reference signal generating unit for receiving the speed command value and outputting a reference signal having a predetermined bandwidth, and an adaptive filter for receiving the reference signal output by said reference signal generating unit and the speed detection value output by the speed detection unit, operating on a filter coefficient for limiting the passage of the frequency component higher than the predetermined frequency superimposed on said speed detection value, and outputting the result to the main filter.

What is claimed is:

1. A closed-loop feedback control system for controlling an operation of a load comprising:
   first subtracting means for subtracting an operation value from a command value, and for outputting a resultant signal as a control signal to control an operation of a load;
   filter means, operatively coupled to said first subtracting means, for passing frequency components of said control signal according to a set filter coefficient; and
   filter coefficient setting means, coupled to said filter means, for setting a filter coefficient and outputting said coefficient to said filter means, said filter coefficient setting means comprises:
   high-pass filter means for receiving said operation value and passing frequency components higher than a predetermined frequency;
   reference signal generating means for generating a reference signal having frequency components less than said predetermined frequency;
   adding means for adding said reference signal to said frequency components passed by said high-pass filter means, and for outputting a resultant signal from said adding; and
   adaptive filter means for receiving said reference signal and said resultant signal, and for selectively limiting passage of said frequency components passed by said high-pass filter means.

2. A closed-loop feedback control system according to claim 1 wherein said adaptive filter means comprises:
   filtering means for receiving said resultant signal output by said adding means, and for producing an output signal selectively limiting passage of said frequency components higher than said predetermined frequency;

second subtracting means for subtracting said output from said filtering means from said reference signal, and for outputting a resultant signal; and filter coefficient adjusting means, coupled to said second subtracting means, for adjusting a filter coefficient of said filtering means, and for outputting said filter coefficient to said filter means.

3. A closed-loop feedback control system according to claim 2, said system further comprising:

amplifying means, coupled to said filter means, for amplifying said resultant signal output from said first subtracting means; and controlling means, coupled to said filter means, for receiving said frequency components passed by said filter means, and for controlling operation of said load according to said frequency components.

4. A closed-loop feedback control system according to claim 2, said system further comprising:

amplifying means, coupled to said first subtracting means, for amplifying said resultant signal output from said first subtracting means; and controlling means, coupled to said amplifying means, for receiving said frequency components passed by said filter means, and for controlling operation of said load according to said frequency components, wherein said filter means is coupled to said first subtracting means and receives feedback from said load.

5. A closed-loop feedback control system according to claim 1, wherein said reference signal generating means receives said command value.

6. A motor speed controller comprising:

deviation detecting means for outputting a deviation value between a speed command value and a speed detection value output by speed detecting means for detecting the speed of a mechanical system including a motor and a load driven by said motor;

operating/amplifying means for operating on, amplifying and outputting said deviation value;

torque controlling means for controlling the torque of said motor in accordance with a torque command value;

a main filter, connected at a location between an output end of said speed detecting means and an input end of said torque controlling means and capable of limiting passage of a frequency component in accordance with a frequency component superimposed on said speed detection value, and outputting a result; and filter coefficient setting means, coupled to said main filter, for setting a filter coefficient of said main filter, said filter coefficient setting means comprises:

reference signal generating means for outputting a reference signal including a frequency component lower than a predetermined frequency;

a high-pass filter for receiving the speed detection value output by the speed detecting means and passing a frequency component higher than the predetermined frequency superimposed on said speed detection value;

adding means for adding the reference signal output by said reference signal generating means and said frequency component having passed said high-pass filter; and an adaptive filter for receiving the output signal of said adding means and said reference signal, and producing a filter coefficient selectively limiting the passage of said frequency component, and outputting the coefficient to the main filter.

7. A motor speed controller comprising:

deviation detecting means for outputting a deviation value between a speed command value and a speed detection value output by speed detecting means for detecting the speed of a mechanical system including a motor and a load driven by said motor;

operating/amplifying means for operating on, amplifying and outputting said deviation value;

torque controlling means for controlling the torque of said motor in accordance with a torque command value;

a main filter, connected at a location between an output end of said speed detecting means and an input end of said torque controlling means and capable of limiting passage of a frequency component in accordance with a frequency component superimposed on said speed detection value, and outputting a result; and filter coefficient setting means, coupled to said main filter, for setting a filter coefficient of said main filter, said filter coefficient setting means comprising:

reference signal generating means for receiving the speed command value and outputting a reference signal having a predetermined bandwidth; and an adaptive filter for receiving the reference signal output by said reference signal generating means and the speed detection value output by the speed detection means, operating on a filter coefficient for selectively limiting the passage of the frequency component higher than the predetermined frequency superimposed on said speed detection value, and outputting the result to the main filter.

* * * * *